(12) United States Patent
Wanner et al.

(10) Patent No.: US 11,383,843 B2
(45) Date of Patent: Jul. 12, 2022

(54) AIRCRAFT TRAY TABLE RETENTION ASSEMBLY

(71) Applicant: B/E Aerospace, Inc., Winston-Salem, NC (US)

(72) Inventors: Jackson R Wanner, Winston-Salem, NC (US); Gregory S. Spencer, Winston-Salem, NC (US); Varun Raman, The Hague (NL); Hans Huijsing, Ijsselstein (NL)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/081,840

(22) Filed: Oct. 27, 2020

(65) Prior Publication Data

US 2022/0127003 A1 Apr. 28, 2022

(51) Int. Cl.
*B64D 11/06* (2006.01)
*A47G 23/06* (2006.01)

(52) U.S. Cl.
CPC .......... *B64D 11/0638* (2014.12); *A47G 23/06* (2013.01); *A47G 2023/0666* (2013.01)

(58) Field of Classification Search
CPC ................ A47B 31/06; A47G 23/06; A47G 2023/0666; B60N 3/004; B64D 11/0638
USPC ............................................ 108/44; 297/163
See application file for complete search history.

(56) References Cited

U.S. PATENT DOCUMENTS

| | | |
|---|---|---|
| 3,610,459 A | 10/1971 | Panson |
| 3,635,511 A | 1/1972 | Waller |
| 3,831,986 A | 8/1974 | Kobayashi |
| 4,973,017 A * | 11/1990 | Takagi .................. B60N 3/004 248/292.13 |
| 6,179,377 B1 | 1/2001 | Harper |
| 10,561,260 B2 | 2/2020 | Carroll et al. |
| 10,709,235 B1 * | 7/2020 | Brown .................. A47B 13/16 |
| 2006/0075934 A1 * | 4/2006 | Ram ............... B64D 11/00155 108/44 |

(Continued)

FOREIGN PATENT DOCUMENTS

| | | |
|---|---|---|
| CN | 106724526 A | 5/2017 |
| DE | 7245169 U | 3/1973 |

(Continued)

OTHER PUBLICATIONS

Partial Search Report in European Application No. 21205084.3 dated Mar. 17, 2022, 12 pages.

*Primary Examiner* — Jose V Chen

(74) *Attorney, Agent, or Firm* — Suiter Swantz pc llo

(57) ABSTRACT

An aircraft tray table retention assembly may include a seat magnetic component installed within a rear bezel of an aircraft seat, and a tray table magnetic component installed within an aircraft tray table. The aircraft tray table may be coupled to the aircraft seat via at least one of one or more hinges or a set of rails, and may be configured to actuate between a stowed position and a deployed position via the at least one of one or more hinges or a set of rails. The tray table magnetic component may be configured to engage the seat magnetic component when the aircraft tray table is in the stowed position. The aircraft tray table retention assembly may include a tray magnetic component configured to engage the tray table magnetic component when the aircraft tray table is in the deployed position.

15 Claims, 14 Drawing Sheets

(56) References Cited

U.S. PATENT DOCUMENTS

| | | | | |
|---|---|---|---|---|
| 2009/0188881 | A1* | 7/2009 | Travis | A47B 23/043 |
| | | | | 211/131.1 |
| 2011/0127190 | A1* | 6/2011 | Bardwell | A45C 11/20 |
| | | | | 206/561 |
| 2012/0241572 | A1* | 9/2012 | McClain | B60R 11/0258 |
| | | | | 248/220.21 |
| 2014/0042781 | A1* | 2/2014 | Reeves | B60R 7/043 |
| | | | | 297/163 |
| 2014/0167457 | A1* | 6/2014 | Schultheis | B64D 11/0624 |
| | | | | 297/162 |
| 2015/0020715 | A1* | 1/2015 | Pajic | B64D 11/0638 |
| | | | | 108/3 |
| 2015/0108798 | A1* | 4/2015 | Boyer, Jr. | B60N 3/004 |
| | | | | 297/163 |
| 2015/0158589 | A1* | 6/2015 | Meckes | B64D 11/0638 |
| | | | | 297/147 |
| 2015/0284086 | A1* | 10/2015 | Gow | B64D 11/003 |
| | | | | 244/118.5 |
| 2016/0039349 | A1* | 2/2016 | Casagrande | B60R 7/043 |
| | | | | 248/205.1 |
| 2017/0021931 | A1* | 1/2017 | Stephens | B60N 3/004 |
| 2017/0027347 | A1* | 2/2017 | Kovacs | A47G 23/06 |
| 2019/0047710 | A1* | 2/2019 | Bell | B60N 2/753 |
| 2019/0053635 | A1* | 2/2019 | Cheung | B60N 3/004 |
| 2019/0054848 | A1* | 2/2019 | Vo | B60N 2/206 |
| 2019/0196475 | A1* | 6/2019 | Vandewall | B64D 11/00 |
| 2019/0225131 | A1* | 7/2019 | Bellamy | B60R 7/043 |
| 2020/0022518 | A1* | 1/2020 | Hutchins | A47G 19/10 |
| 2021/0300563 | A1* | 9/2021 | Maurmaier | G09F 9/335 |
| 2021/0323678 | A1* | 10/2021 | Kohlmeier-Beckmann | |
| | | | | A61L 2/088 |
| 2021/0339870 | A1* | 11/2021 | Frost | B64D 11/0638 |

FOREIGN PATENT DOCUMENTS

| | | |
|---|---|---|
| DE | 2358448 A1 | 5/1975 |
| DE | 4005662 A1 | 8/1991 |
| GB | 2525171 A | 10/2015 |
| GB | 2554438 B | 10/2019 |
| KR | 2019980023804 U | 7/1998 |
| KR | 2019980026359 U | 8/1998 |
| KR | 2019980033829 U | 9/1998 |
| KR | 200377105 Y1 | 3/2005 |
| WO | 2020197567 A1 | 10/2020 |

* cited by examiner

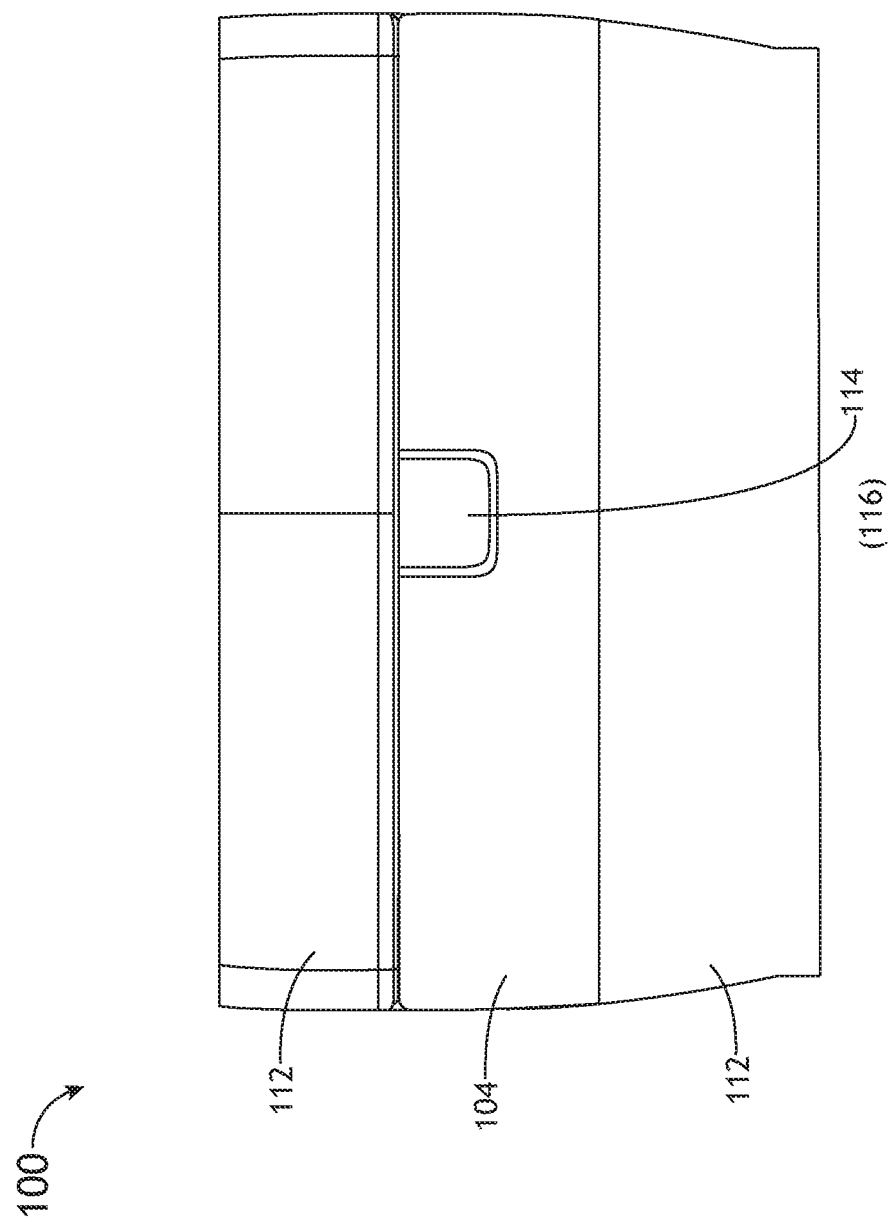

AIRCRAFT TRAY TABLE RETENTION ASSEMBLY

BACKGROUND

An aircraft tray table may be held in an upright or stowed position against an aircraft seat with a retainer latch assembly. The retainer latch assembly may require moving components, and may decrease an amount of passenger living space proximate to the aircraft tray table when in the upright or stowed position should any components of the retainer latch assembly be exterior to the aircraft tray table. In addition, the retainer latch assembly may prevent a flight from departing, if exterior to the aircraft tray table and broken following an interaction by a passenger.

In addition, an aircraft tray table may be utilized for meal time during a flight. The meal may be served in meal trays, which may slide on the aircraft tray table during flight maneuvers. The sliding may be exacerbated by the meal trays warping, bending, or otherwise being deformed due to use and cleaning. In addition, drinks may slide on the aircraft tray table during flight maneuvers (e.g., during meal time or other times throughout the flight).

SUMMARY

An aircraft tray table retention assembly is disclosed, in accordance with one or more embodiments of the disclosure. The aircraft tray table retention assembly may include a seat magnetic component installed within a rear bezel of an aircraft seat. The aircraft tray table retention assembly may include a tray table magnetic component installed within an aircraft tray table. The aircraft tray table may be coupled to the aircraft seat via at least one of one or more hinges or a set of rails. The aircraft tray table may be configured to actuate between a stowed position and a deployed position via the at least one of the one or more hinges or the set of rails. The tray table magnetic component may be configured to engage the seat magnetic component when the aircraft tray table is in the stowed position. A top surface of the aircraft tray table may be in contact with at least one of the seat magnetic component or the rear bezel when the aircraft tray table is in the stowed position. The tray table magnetic component may be configured to disengage from the seat magnetic component when a force is applied to at least one of a side surface, an edge, or a corner of the aircraft tray table.

In some embodiments, the aircraft tray table may include a casing. The top surface of the aircraft tray table may be a surface of the casing. The aircraft tray table may include a frame installed within the casing. The frame may include a cut-out configured to receive at least a portion of the tray table magnetic component.

In some embodiments, the seat magnetic component may include a mounting plate fabricated from a magnetic metal, the mounting plate coupled to the bezel via a bezel bracket. The tray table magnetic component may include a magnet.

In some embodiments, the seat magnetic component may include a magnet. The tray table magnetic component may include an internal plate fabricated from a magnetic metal.

In some embodiments, the seat magnetic component may include a magnet of a first polarization. The tray table magnetic component may include a magnet of a second polarization. The magnet of the second polarization may be configured to attract the magnet of the first polarization In some embodiments, the seat magnetic component may include an electromagnet. The tray table magnetic component may include an internal plate fabricated from a magnetic metal. The electromagnet may be configured to be controlled via a switch installed on the aircraft tray table, proximate to the aircraft tray table, or within an aircraft cabin including the aircraft seat.

In some embodiments, the seat magnetic component may include a magnetic sensor. The magnetic sensor may be configured to transmit information to a controller within an aircraft cabin including the aircraft seat. The information transmitted may include a determination whether the aircraft tray table is in the stowed position or the deployed position.

An aircraft tray table retention assembly is disclosed, in accordance with one or more embodiments of the disclosure. The aircraft tray table retention assembly may include a tray magnetic component installed within an aircraft tray. The aircraft tray table retention assembly may include a tray table magnetic component installed within an aircraft tray table. The aircraft tray table may be coupled to an aircraft seat via at least one of one or more hinges or a set of rails. The aircraft tray table may be configured to actuate between a stowed position and a deployed position via the at least one of the one or more hinges or the set of rails. The tray magnetic component may be configured to engage the tray table magnetic component when the aircraft tray table is in the deployed position. A bottom surface of the aircraft tray may be in contact with a top surface of the aircraft tray table when the aircraft tray table is in the deployed position. The tray magnetic component may be configured to disengage from the tray table magnetic component when a force is applied to at least one of a side surface, an edge, or a corner of the aircraft tray.

In some embodiments, the tray table magnetic component may include an internal plate fabricated from a magnetic metal. The tray magnetic component may include a magnet.

In some embodiments, the tray table magnetic component may include a magnet. The tray magnetic component may include an internal plate fabricated from a magnetic metal.

In some embodiments, the tray table magnetic component may include a magnet of a first polarization. The tray magnetic component may include a magnet of a second polarization. The magnet of the second polarization may be configured to attract the magnet of the first polarization.

In some embodiments, the tray table magnetic component may include an electromagnet. The tray magnetic component may include an internal plate fabricated from a magnetic metal. The electromagnet may be configured to be controlled via a switch installed on the aircraft tray table, proximate to the aircraft tray table, or within an aircraft cabin including the aircraft seat.

In some embodiments, the tray table magnetic component may include a magnetic sensor. The magnetic sensor may be configured to transmit information to a controller within an aircraft cabin including the aircraft seat. The information transmitted may include a determination whether the aircraft tray is positioned on the aircraft tray table.

In some embodiments, at least one of the tray table or tableware may be positionable on a galley workbench. The galley workbench may include a galley workbench magnetic component. At least one of the tray table magnetic component installed within the tray table or a tableware magnetic component installed within the tableware may be configured to engage the galley workbench magnetic component when the at least one of the tray table or the tableware is positioned on the galley workbench.

In some embodiments, at least one of the tray table or tableware may be positionable on a galley cart. The galley cart may include a galley cart magnetic component. At least one of the tray table magnetic component installed within the tray table or a tableware magnetic component installed within the tableware may be configured to engage the galley cart magnetic component when the at least one of the tray table or the tableware is positioned on the galley cart.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1B illustrates a rear view of a portion of an aircraft seat, in accordance with one or more embodiments of the disclosure;

DETAILED DESCRIPTION OF THE INVENTION

Figure 1A:
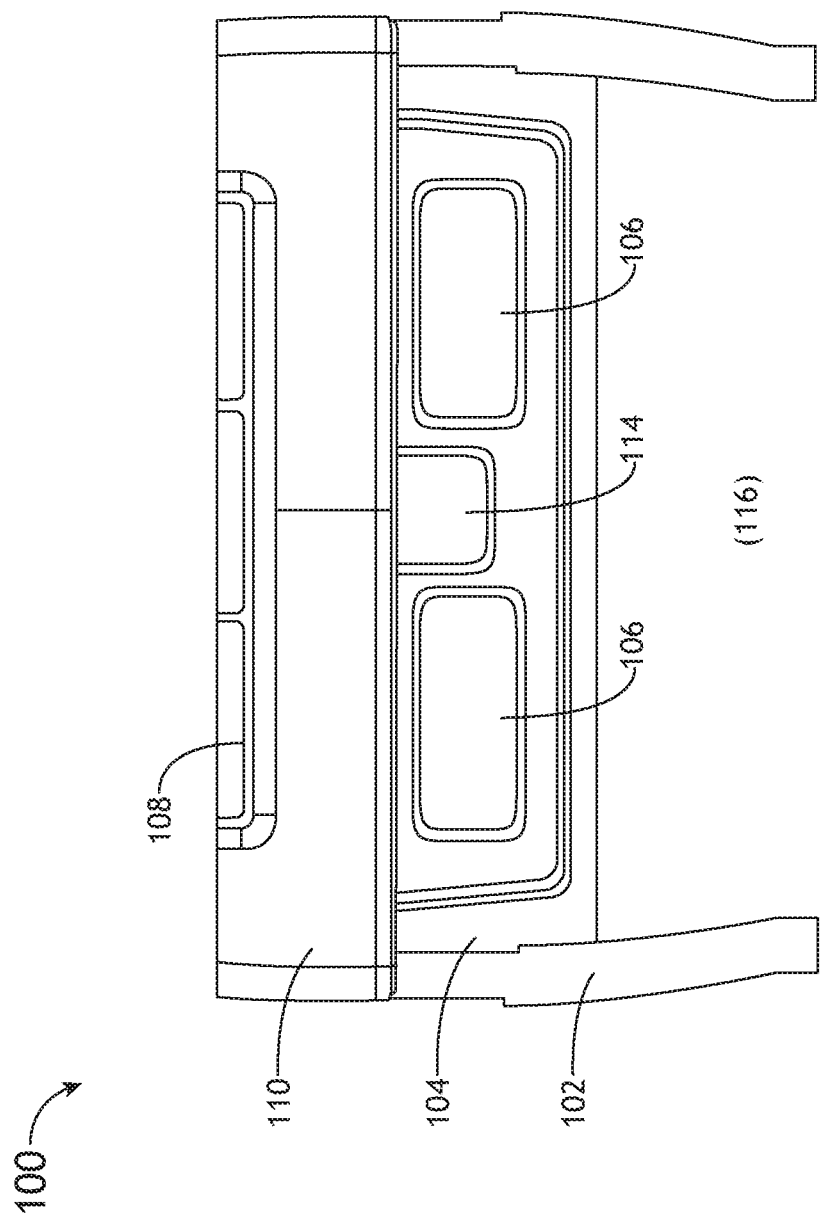
FIG. 1A illustrates a rear view of a portion of an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-7C in general illustrate an aircraft tray table retention assembly, in accordance with one or more embodiments of the disclosure.

An aircraft tray table may be held in an upright or stowed position against an aircraft seat with a retainer latch assembly. The retainer latch assembly may require moving parts, and may decrease an amount of passenger living space proximate to the aircraft tray table when in the stowed position should any components of the retainer latch assembly be exterior to the aircraft tray table. For example, the retainer latch of the retainer latch assembly may be exterior to the aircraft tray table, causing an area proximate to the rear of the aircraft seat and/or the aircraft tray table to be unusable by the passenger. In addition, the retainer latch assembly may prevent a flight from departing, if exterior to the aircraft tray table and broken following an interaction by a passenger during a flight.

In addition, an aircraft tray table may be utilized for meal time during a flight. The meal may be served in meal trays, which may slide on the aircraft tray table during flight maneuvers. The sliding may be exacerbated by the meal trays warping, bending, or otherwise being deformed due to use and cleaning. In addition, drinks may slide on the aircraft tray table during flight maneuvers (e.g., during meal time or other times throughout the flight).

Figure 1C:
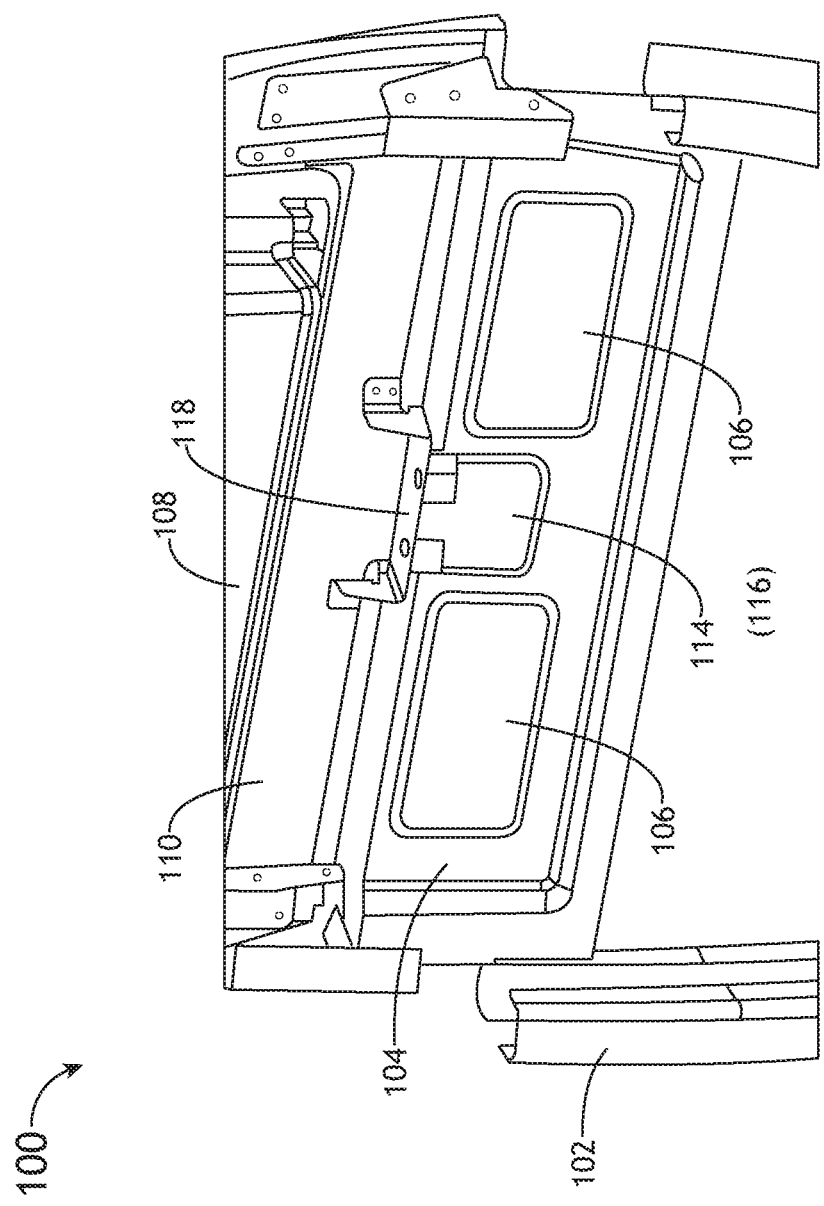
FIG. 1C illustrates an inverse rear view of a portion of an aircraft seat, in accordance with one or more embodiments of the disclosure.

FIGS. 1A-1C illustrate example embodiments of an aircraft seat 100, in accordance with one or more embodiments of the disclosure.

The aircraft seat 100 may include a seat frame 102. The aircraft seat 100 may include a rear plate or rear bezel 104. As illustrated in FIGS. 1A and 1C, the rear plate or rear bezel 104 may be coupled to the seat frame 102. The rear plate or rear bezel 104 may include one or more openings 106. For example, the one or more openings 106 may be coupled to one or more pockets 108 within an upper shell 110 of the aircraft seat 100. For instance, the one or more openings 106 may allow for waste (e.g., paper scraps, food particles, dirt, or the like) to exit from the one or more pockets 108. As illustrated in FIG. 1B, the rear plate or rear bezel 104 may be coupled to or at least partially embedded within a seat back cushion 112 of the aircraft seat 100.

The rear plate or rear bezel 104 may include one or more magnetic components 114 of a magnetic retention assembly 116. For example, the one or more magnetic components 114 may include a mounting plate fabricated from a magnetic metal. By way of another example, the one or more magnetic components 114 may include a magnet with a first polarization. It is noted herein the magnet may be a mechanism magnet requiring a specific motion (e.g., a twisting motion, or the like), or may be a pushbutton-style magnet or a spring-loaded magnet, giving the magnetic retention assembly 116 a feeling of being a mechanical retention mechanism.

By way of another example, the one or more magnetic components 114 may include an electromagnet. For instance, the electromagnet may require a switch installed for on/off release (e.g., on an aircraft tray table 200 coupled to the aircraft seat 100, proximate to the aircraft tray table 200 coupled to the aircraft seat 100, and/or within an aircraft cabin, the aircraft tray table 200 being as described throughout the disclosure).

Figure 7A:
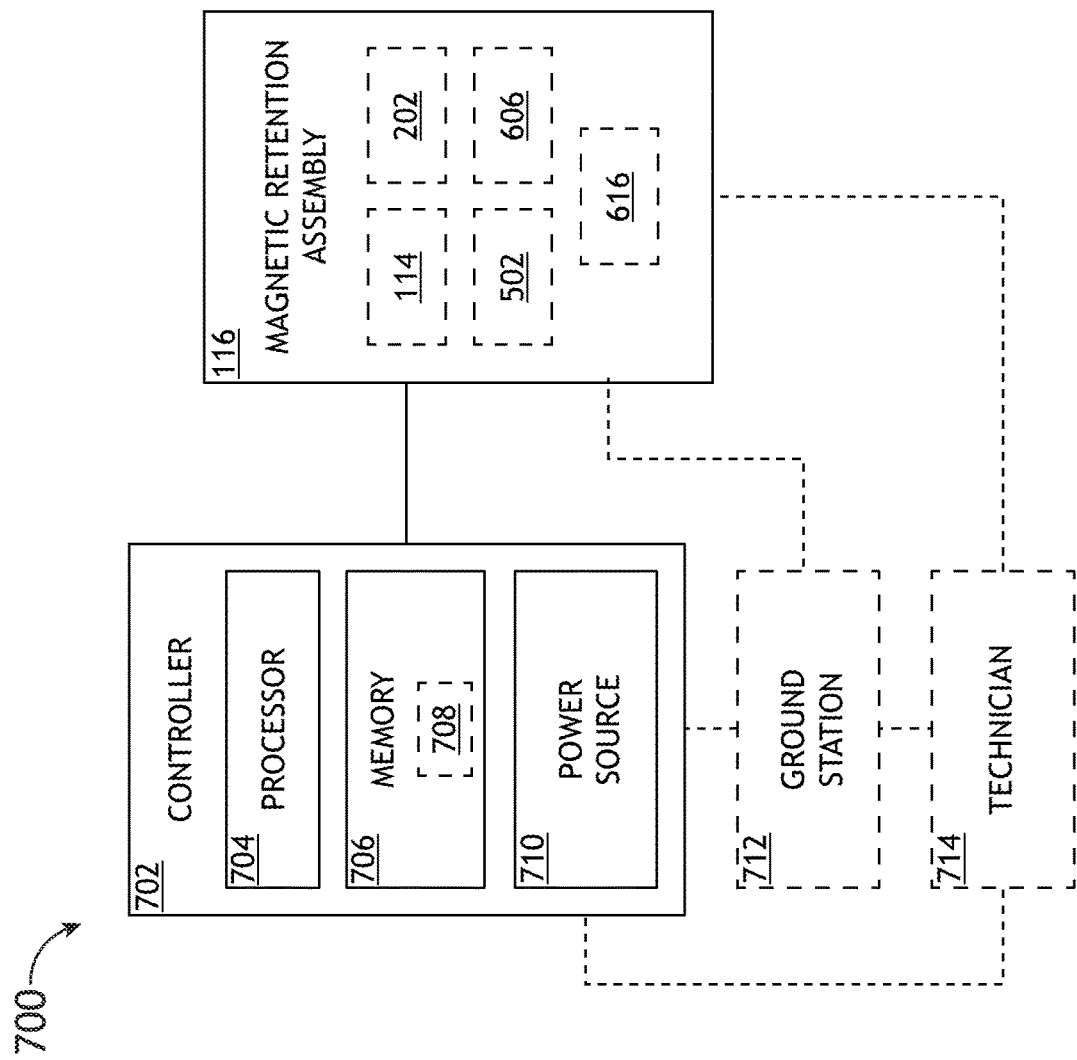
FIG. 7A illustrates a simplified block diagram view of an aircraft cabin, in accordance with one or more embodiments of the disclosure.
Figure 7B:
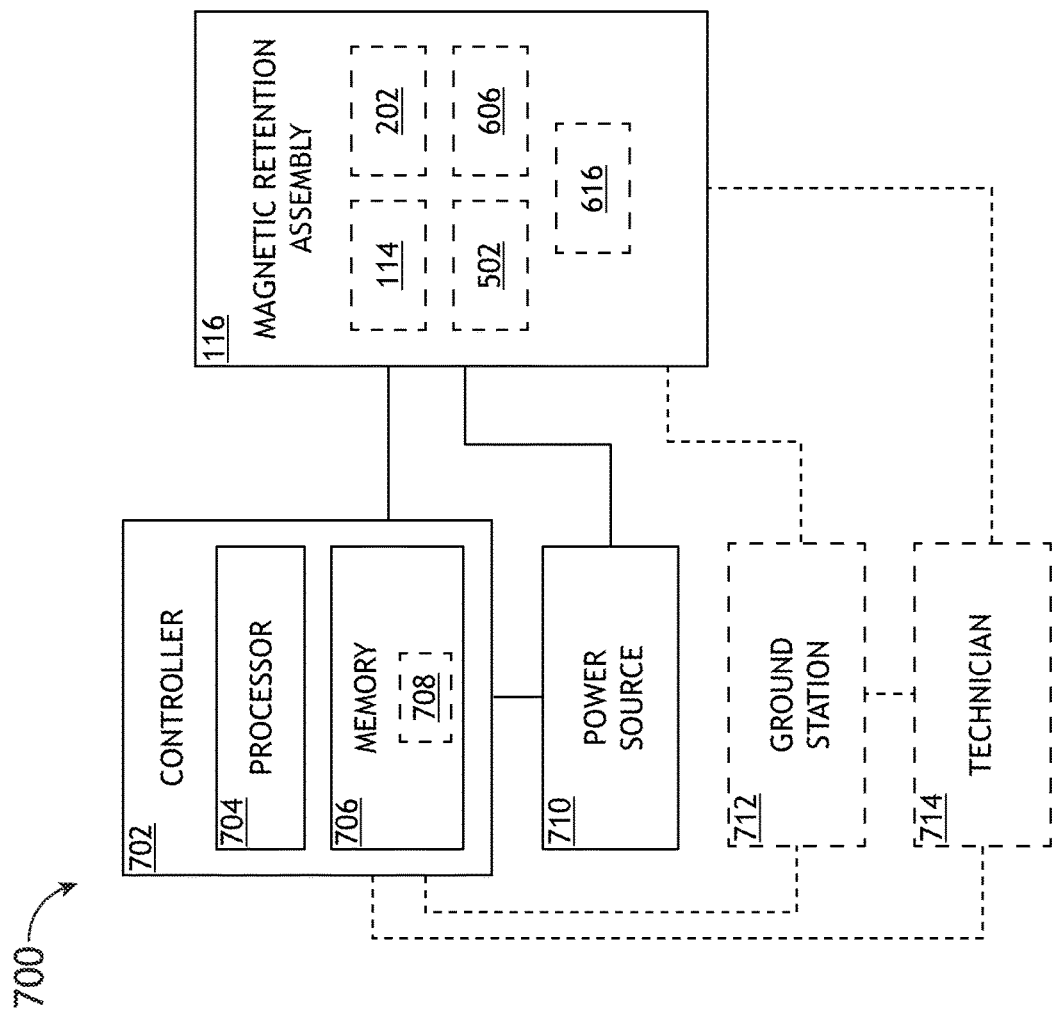
FIG. 7B illustrates a simplified block diagram view of an aircraft cabin, in accordance with one or more embodiments of the disclosure.

By way of another example, the one or more magnetic components 114 may include a magnetic sensor component. For instance, the magnetic switch may include a magnet or a plate and a sensor coupled to circuitry, where information transmitted via the circuitry is received by a controller within an aircraft including the aircraft seat 100, received by a ground station, or received by an aircraft operator or diagnostic technician (e.g., as illustrated in FIGS. 7A and 7B). For example, the magnetic sensor component may assist in determining whether the tray table 200 is in a stowed or a deployed position, such that a crew member (e.g., flight attendant, or the like) does not have to manually check each tray table 200.

It is noted herein that any of the above-listed examples for the one or more magnetic components 114 may be used in addition to or instead of the other above-listed examples for magnetic components of the magnetic retention assembly 116, such that any number or type of magnetic components 114 may be used.

The one or more magnetic components 114 may be attached to a bezel bracket 118. For example, the one or more magnetic components 114 may be attached to the bezel bracket 118 via one or more fasteners (e.g., screws, rivets, or the like), an adhesive, one or more fabrication processes (e.g., welding, or the like), one or more interlocking assemblies (e.g., hook-and-loop assemblies, tab-and-groove assemblies, snap-fit assemblies, or the like), or another joining or coupling method. Where the one or more magnetic components 114 include a mounting plate, the mounting plate and the bezel bracket 118 may be fabricated as a single component or as separate and joinable or couplable components. By way of another example, the bezel bracket 118 may be attached to the bezel 104 or the upper shell 110 via one or more fasteners (e.g., screws, rivets, or the like), an adhesive, one or more fabrication processes (e.g., welding, or the like), one or more interlocking assemblies (e.g., hook-and-loop assemblies, tab-and-groove assemblies, snap-fit assemblies, or the like), or another joining or coupling method. Although not shown, it should be understood the one or more magnetic components 114 may be attached to the bezel 104 and inset within the seat back cushion 112 illustrated in FIG. 1B).

Although embodiments of the disclosure illustrate the one or more magnetic components 114 as being located within the aircraft seat 100, it is noted herein the illustrated locations are not limiting and that the one or more magnetic components 114 may be installed at any exterior location on or interior location within the aircraft seat 100.

Figure 2:
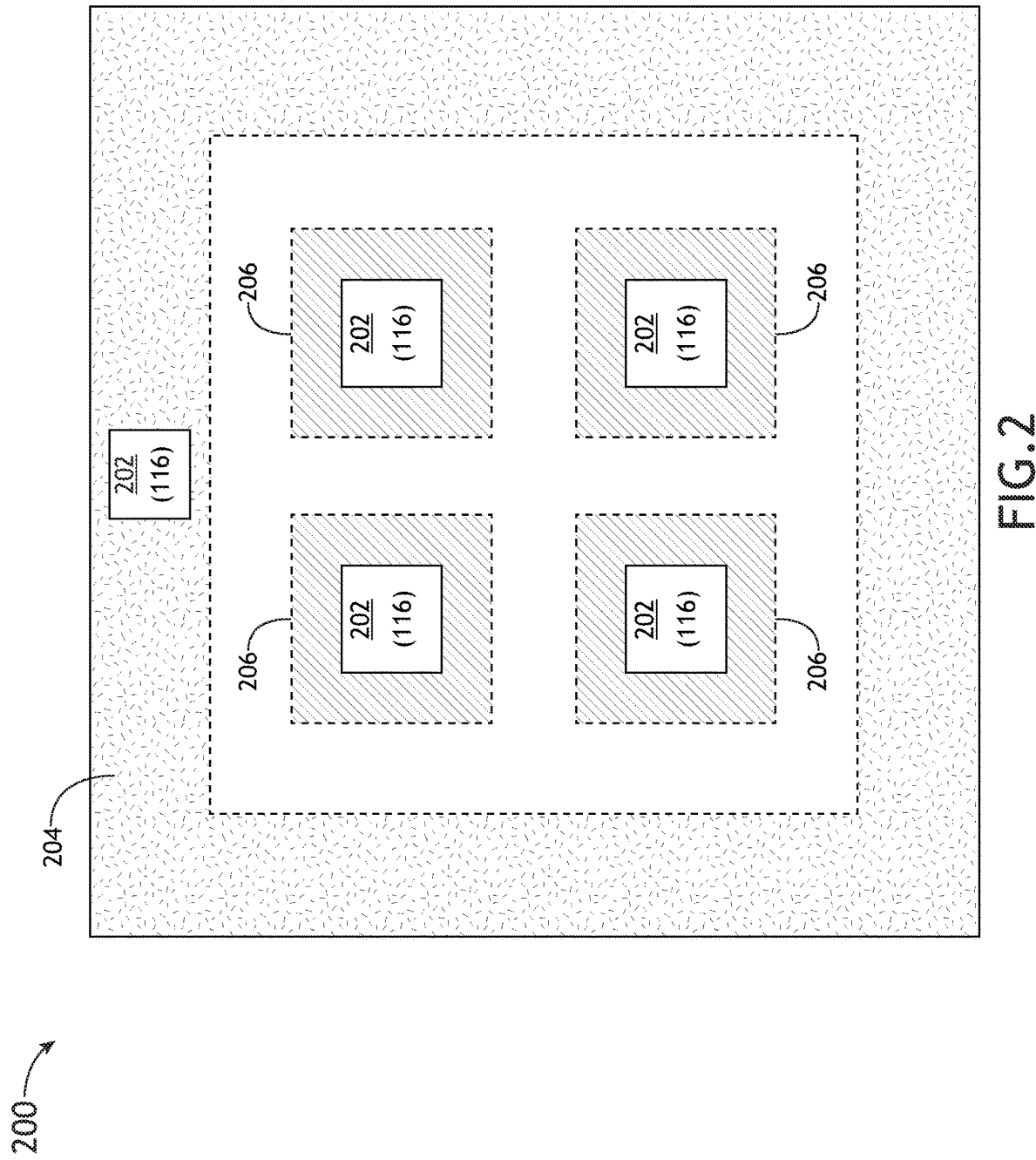
FIG. 2 illustrates a simplified block diagram of an aircraft tray table, in accordance with one or more embodiments of the disclosure.

FIG. 2 illustrates a simplified block diagram of the aircraft tray table 200 coupled to the aircraft seat 100, in accordance with one or more embodiments of the disclosure. It is noted herein "aircraft tray table" and "tray table" may be considered equivalent, for purposes of the disclosure.

The tray table 200 may include one or more magnetic components 202 of the magnetic retention assembly 116. For example, the one or more magnetic components 202 may include a magnet of a first polarization or second polarization. For instance, where the one or more magnetic components 114 include a mounting plate, the magnet of the one or more magnetic components 202 may be of a first polarization. In addition, where the one or more magnetic components 202 include a magnet of a first polarization, the magnet of the one or more magnetic components 114 may be of a second polarization configured to attract the first polarization. It is noted herein the magnet may be a mechanism magnet requiring a specific motion (e.g., a twisting motion, or the like), or may be a pushbutton-style magnet or a spring-loaded magnet, giving the magnetic retention assembly 116 a feeling of being a mechanical retention mechanism.

By way of another example, the one or more magnetic components 202 may include an internal plate fabricated from a magnetic metal. For instance, the internal plate may be configured to engage the one or more magnetic components 114, where the one or more magnetic components 114 include a magnet.

By way of another example, the one or more magnetic components 202 may include an electromagnet. For instance, the electromagnet may require a switch installed (e.g., on the tray table 200, proximate to the tray table 200 or an aircraft seat 100, and/or within an aircraft cabin) for on/off release.

By way of another example, the one or more magnetic components 202 may include a magnetic sensor component. For instance, the magnetic switch may include a magnet or a plate and a sensor coupled to circuitry, where information transmitted via the circuitry is received by a controller within an aircraft including the aircraft seat 100, received by a ground station, or received by an aircraft operator or diagnostic technician (e.g., as illustrated in FIGS. 7A and 7B). For example, the magnetic sensor component may assist in determining whether the tray table 200 is in a stowed or a deployed position.

It is noted herein that any of the above-listed examples for the one or more magnetic components 202 may be used in addition to or instead of the other above-listed examples for magnetic components of the magnetic retention assembly 116, such that any number or type of magnetic components 202 may be used.

The one or more magnetic components 202 may be installed at one or more periphery locations 204 proximate to a perimeter of the tray table 200, where the one or more periphery locations 204 correspond to one or more locations where the one or more magnetic components 114 are installed on the aircraft seat 100. For example, the one or more magnetic components 202 may be installed in a vertical strip and/or a horizontal strip along the side or top edge of the tray table 200, respectively. It is noted herein any number of magnetic components 202 may be installed at the one or more periphery locations 204.

The one or more magnetic components 202 may be installed at one or more inner locations 206 defined inside the one or more periphery locations 204 of the tray table 200, where the one or more inner locations 206 correspond to one or more locations where the one or more magnetic components 114 are installed on the aircraft seat 100. It is noted herein any number of magnetic components 202 may be installed at the one or more inner locations 206.

The one or more magnetic components 202 may be installed at one or more periphery locations 204 and at one or more inner locations 206 defined inside the one or more periphery locations 204. It is noted herein any number of magnetic components 202 may be installed at the one or more periphery locations 204 and the one or more inner locations 206.

Although embodiments of the disclosure illustrate the one or more magnetic components 202 as being located installed within the tray table 200, it is noted herein the illustrated locations are not limiting and that the one or more magnetic components 202 may be installed at any exterior location on or interior location within the tray table 200 such that the one or more magnetic components 114 may engage the one or more magnetic components 202 when the tray table 200 is in a stowed position.

Figure 3A:
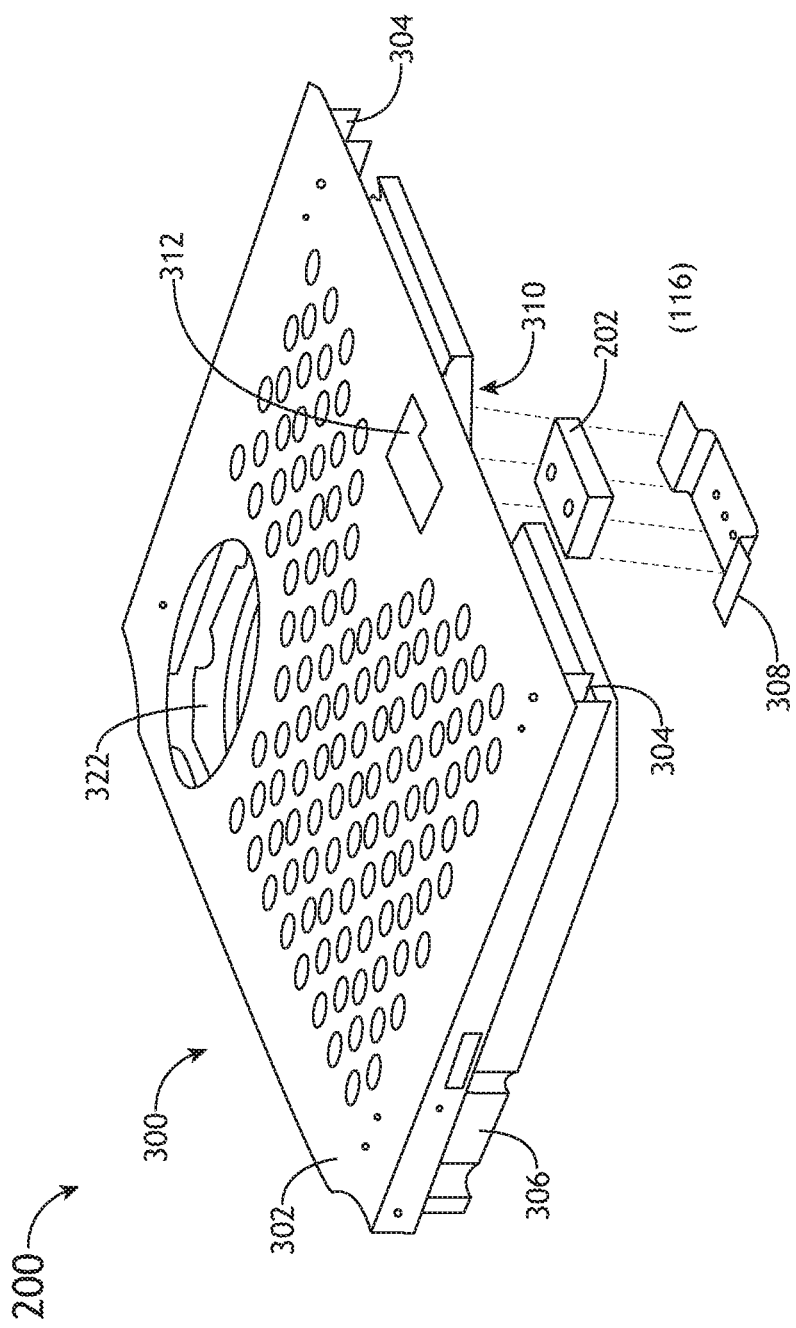
FIG. 3A illustrates a partial exploded perspective view of an aircraft tray table, in accordance with one or more embodiments of the disclosure.
Figure 3B:
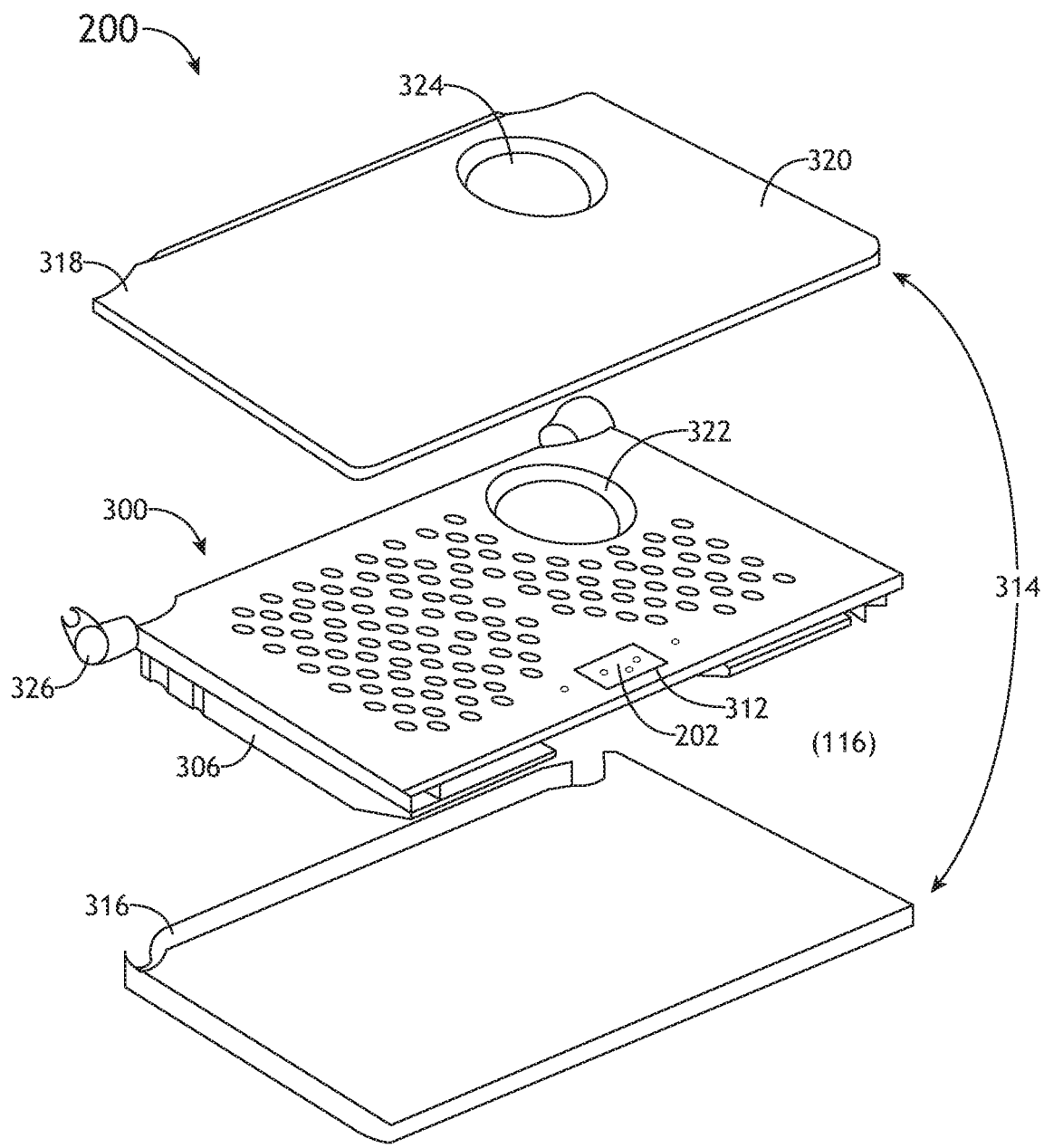
FIG. 3B illustrates an exploded perspective view of an aircraft tray table, in accordance with one or more embodiments of the disclosure.

FIGS. 3A and 3B illustrate an example embodiment of the aircraft tray table 200, in accordance with one or more embodiments of the disclosure.

The tray table 200 may include an inner section 300. The inner section 300 may include a frame 302. The frame 302 may include one or more tracks 304 for one or more rails coupled to the aircraft seat 100, where the tray table 200 is configured to actuate between a first down or deployed position and at least one additional down or deployed position. For example, the first deployed position may be proximate to the aircraft seat 100, and the at least one additional deployed position may be a selected distance from the aircraft seat 100.

The inner section 300 may include a filler 306. For example, the filler 306 may be attached to the frame 302 via one or more fasteners (e.g., screws, rivets, or the like), an adhesive, one or more fabrication processes (e.g., welding, or the like), one or more interlocking assemblies (e.g., hook-and-loop assemblies, tab-and-groove assemblies, snap-fit assemblies, or the like), or another joining or coupling method.

The inner section 300 may be configured to receive the one or more magnetic components 202. The one or more magnetic components 202 may be attached to the frame 302 and/or the filler 306 via one or more fasteners (e.g., screws, rivets, or the like), an adhesive, one or more fabrication processes (e.g., welding, or the like), one or more interlocking assemblies (e.g., hook-and-loop assemblies, tab-and-groove assemblies, snap-fit assemblies, or the like), or another joining or coupling method. The one or more magnetic components 202 may be held in place relative to the frame 302 and/or the filler 306 by a bracket 308, where the bracket 308 may be attached to the frame 302 and/or the filler 306 via one or more fasteners (e.g., screws, rivets, or the like), an adhesive, one or more fabrication processes (e.g., welding, or the like), one or more interlocking assemblies (e.g., hook-and-loop assemblies, tab-and-groove assemblies, snap-fit assemblies, or the like), or another joining or coupling method.

The filler 306 may include one or more cut-outs 310 configured to receive at least a portion of the one or more magnetic components 202. The frame 302 may include one or more cut-outs 312 configured to receive at least a portion of the one or more magnetic components 202.

The tray table 200 may include may include a casing 314. The casing 314 may include one or more shells. For example, the casing 314 may include, but is not limited to, a bottom shell 316 and a top shell 318. The top shell 318 may be attached to the bottom shell 316 via one or more fasteners (e.g., screws, rivets, or the like), an adhesive, one or more fabrication processes (e.g., welding, or the like), one or more interlocking assemblies (e.g., hook-and-loop assemblies, tab-and-groove assemblies, snap-fit assemblies, or the like), or another joining or coupling method.

The top shell 318 may include a top surface 320. For example, the top surface 320 may be a surface used when the tray table 200 is in the deployed position. The frame 302 may include a cut-out 322 for a cup holder 324 or other indentation within the top surface 320 of the top shell 318. The tray table 200 may include one or more hinges 326 configured to allow the tray table 200 to actuate (e.g., rotate) between the stowed position and the first deployed position.

Where the frame 302 is fabricated from a magnetic metal, it is noted herein the frame 302 may serve as a magnetic component 202 of the tray table 200 (e.g., where a corresponding magnetic component 114 of the aircraft seat 100 includes a magnet).

Figure 4A:
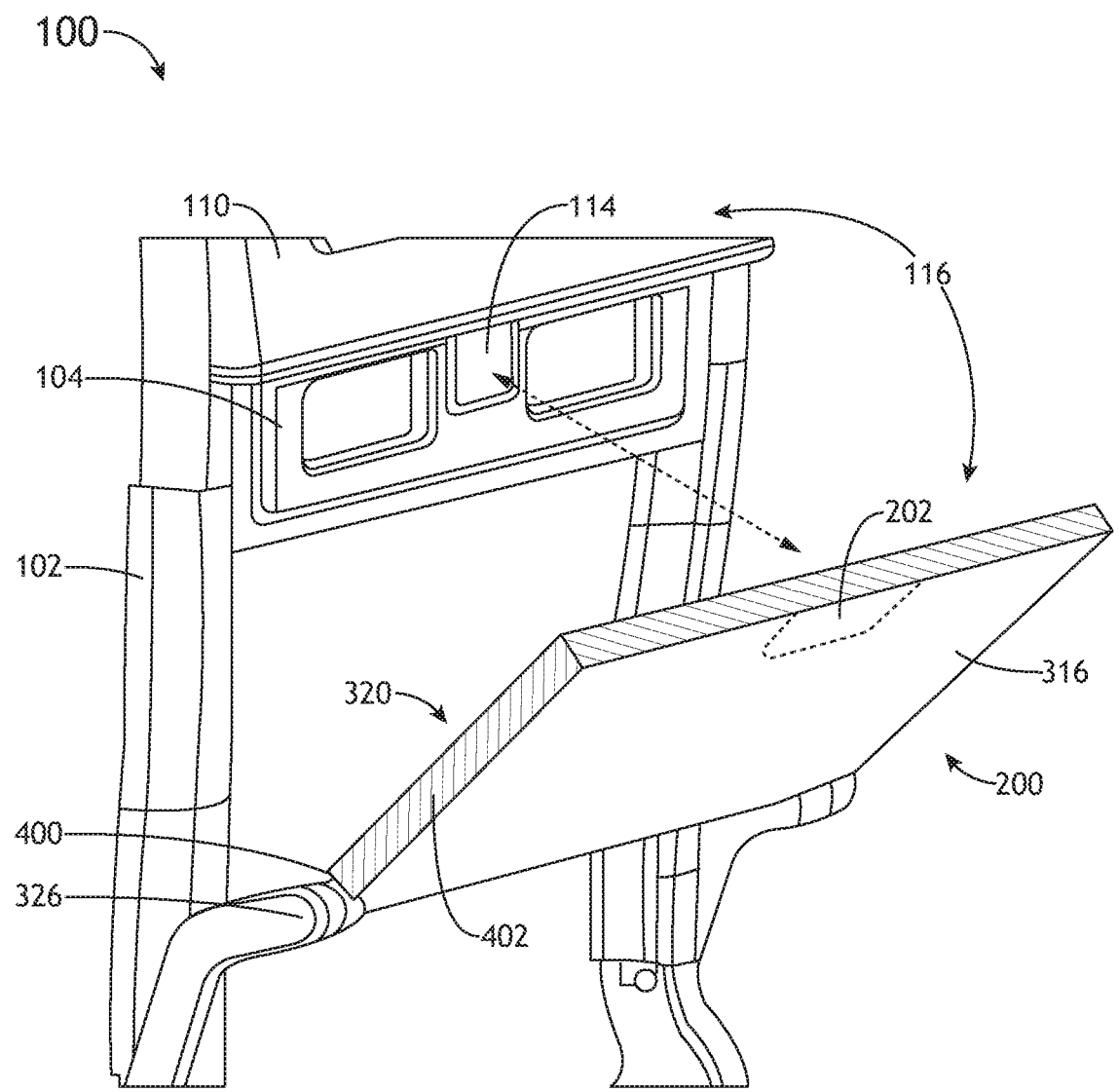
FIG. 4A illustrates a partial perspective view of a portion of an aircraft seat including an aircraft tray table, in accordance with one or more embodiments of the disclosure.
Figure 4B:
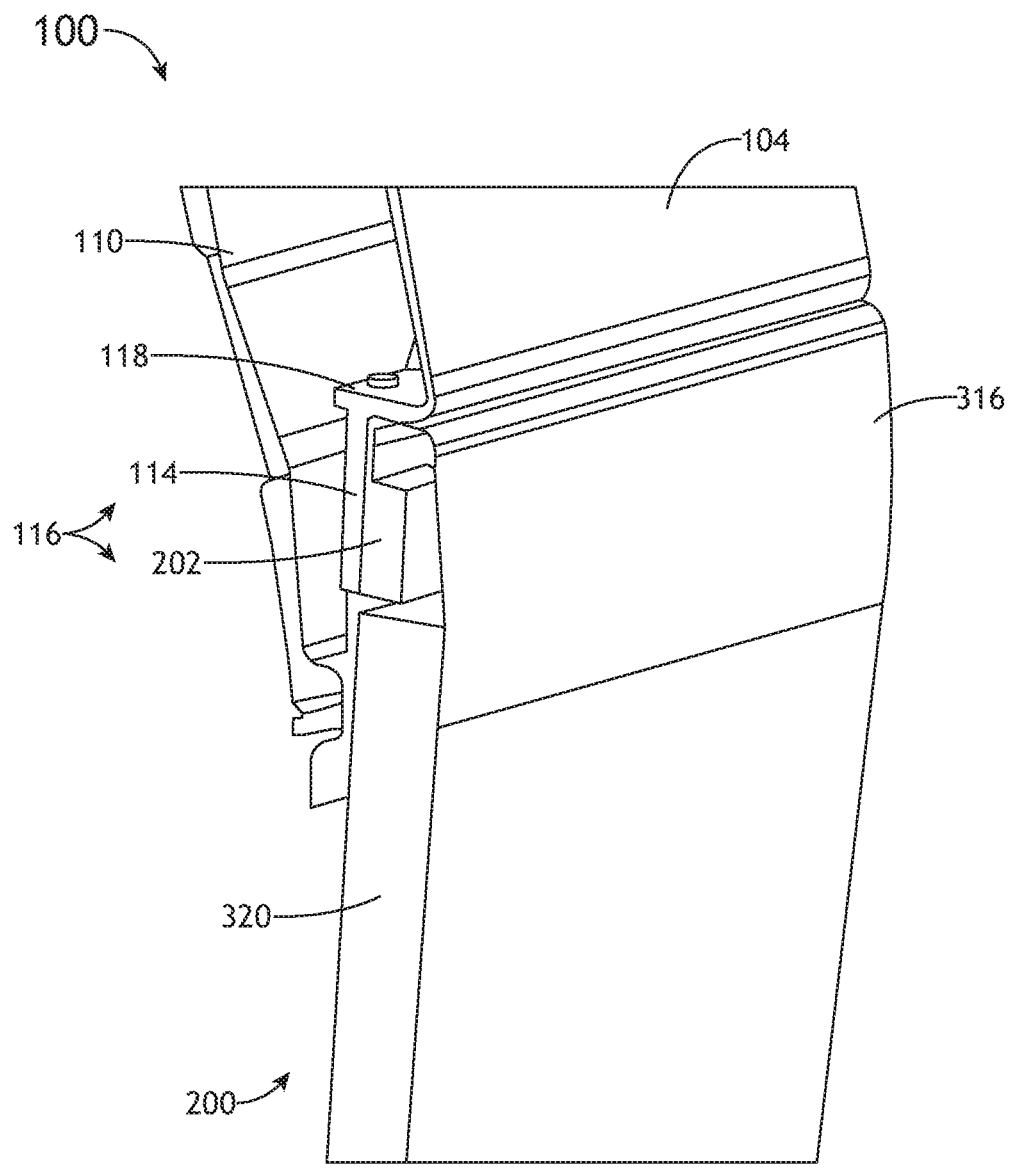
FIG. 4B illustrates a partial cross-section perspective view of a portion of an aircraft seat including an aircraft tray table, in accordance with one or more embodiments of the disclosure.

FIGS. 4A and 4B illustrate an example embodiment of the aircraft tray table 200 and the aircraft seat 100, in accordance with one or more embodiments of the disclosure.

As illustrated in FIG. 4A, the tray table 200 may be configured to actuate (e.g., rotate) about an axis through the one or more hinge 326 between the stowed position and the first deployed position. The tray table 200 may be configured to actuate (e.g., translate) via a set of rails 400 inserted within the tray table 200 (e.g., within the one or more tracks 304 of the inner section 300) between the first deployed position and the at least an additional deployed position. It is noted herein the set of rails 400 may be in addition to or instead of the one or more hinges 326.

A user (e.g., passenger, crew member, or the like) may interact with the tray table 200 at any point along at least one of a side surface, an edge, and/or a corner 402 of the tray table 200, in order to engage or disengage the magnetic retention assembly 116 (e.g., through engaging or disengaging the one or more magnetic components 202 from the one or more magnetic components 114) and cause the tray table 200 to actuate between the stowed position and the deployed positions. It is noted herein the side surface, the edge, and/or the corner 402 may be smooth, or may include one or more grooves or indentations for a user to engage when actuating the tray table 200 between the stowed position and the deployed positions. In this regard, the tray table 200 is configurable per special manufacturing requests, as opposed to being limited to a central location such as that used for a retainer latch assembly.

As illustrated in FIG. 4B, being set within at least one of the one or more cut-outs 310 of the filler 306 or the one or more cut-outs 312 of the frame 302, the one or more magnetic components 202 may be set as close as desired to the top surface 320 of the tray table 200. This positioning may allow for enough magnetic force between the one or more magnetic components 114 and the one or more magnetic components 202 of the magnetic retention assembly 116 to hold the tray table 200 closed against the aircraft seat 100 when the tray table 200 is in the stowed position. While the tray table 200 is in the stowed position, the top surface 320 may be in contact with at least one of the one or more magnetic components 114 and/or the at least a portion of the bezel 104.

Although not shown, it should be understood the aircraft seat 100 illustrated in FIGS. 4A and 4B may be configured with the seat back cushion 112 as illustrated in FIG. 1B.

Although embodiments of the disclosure illustrate the use of magnetic components 114, 202 of the magnetic retention assembly 116 that may attract one another, it is noted herein the magnetic retention assembly 116 may include magnetic components configured to force the tray table 200 into locking into a desired (e.g., stowed or deployed) position.

In this regard, the magnetic retention assembly 116 may act as a magnetic latch assembly and replace a retainer latch assembly configured to actuate from a closed position and an open position, where the retainer latch assembly engages a surface of the tray table 200 when the tray table 200 is in a stowed position and the mechanical latch is in the closed position. Replacing the retainer latch assembly with the magnetic retention assembly 116 may remove a detractor from the amount of user living space proximate to the aircraft tray table. Replacing the retainer latch assembly with the magnetic retention assembly 116 removes a breakable component within the aircraft cabin which may prevent a flight from departing, if broken following an interaction by the user during the flight.

Figure 5:
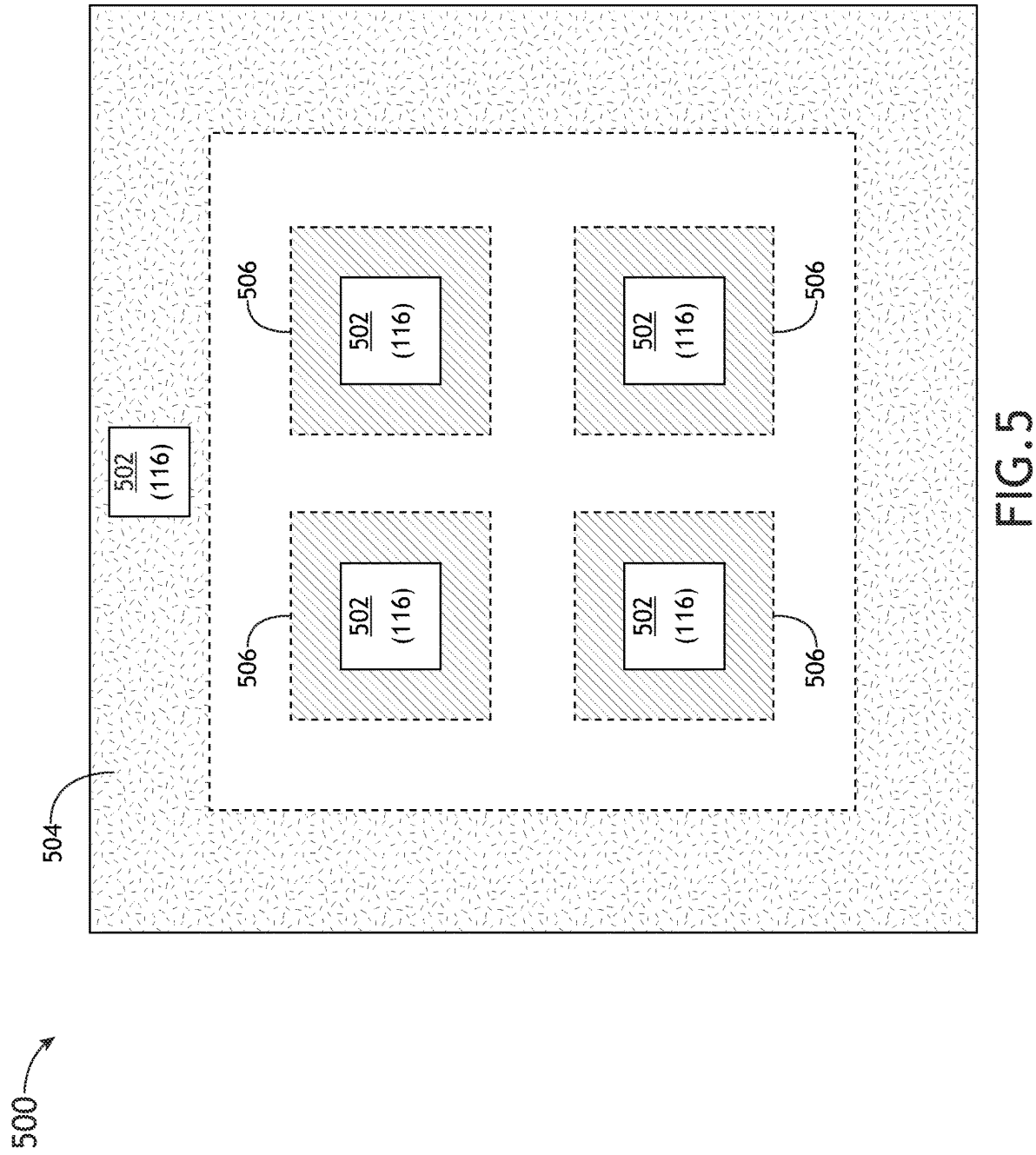
FIG. 5 illustrates a simplified block diagram of an aircraft tray, in accordance with one or more embodiments of the disclosure.

FIG. 5 illustrates simplified block diagrams of the aircraft tray table 200 and an aircraft tray 500, in accordance with one or more embodiments of the disclosure. It is noted herein "aircraft tray" and "tray" may be considered equivalent, for purposes of the disclosure.

The tray 500 may include one or more magnetic components 502 of the magnetic retention assembly 116. For example, the one or more magnetic components 502 may include a magnet of a first polarization or second polarization. For instance, where the one or more magnetic components 202 include a mounting plate, the magnet of the one or more magnetic components 502 may be of a first polarization. In addition, where the one or more magnetic components 202 include a magnet of a first polarization, the magnet of the one or more magnetic components 502 may be of a second polarization configured to attract the first polarization. It is noted herein the magnet may be a mechanism magnet requiring a specific motion (e.g., a twisting motion, or the like), or may be a pushbutton-style magnet or a spring-loaded magnet, giving the magnetic retention assembly 116 a feeling of being a mechanical retention mechanism.

By way of another example, the one or more magnetic components 502 may include a plate fabricated from a magnetic metal. For instance, the plate may be configured to engage the one or more magnetic components 202, where the one or more magnetic components 202 include a magnet.

By way of another example, the one or more magnetic components 502 may include an electromagnet. For instance, the electromagnet may require a switch installed (e.g., on the tray 500, on the tray table 200, proximate to the tray table 200 or an aircraft seat 100, and/or within an aircraft cabin) for on/off release.

By way of another example, the one or more magnetic components 502 may include a magnetic sensor component. For instance, the magnetic switch may include a magnet or a plate and a sensor coupled to circuitry, where information transmitted via the circuitry is received by a controller within an aircraft including the aircraft seat 100, received by a ground station, or received by an aircraft operator or diagnostic technician (e.g., as illustrated in FIGS. 7A and 7B). For example, the magnetic sensor component may assist in determining whether the tray 500 is on the tray table 200.

It is noted herein that any of the above-listed examples for the one or more magnetic components 502 may be used in addition to or instead of the other above-listed examples for magnetic components of the magnetic retention assembly 116, such that any number or type of magnetic components 502 may be used.

The one or more magnetic components 502 may be installed at one or more periphery locations 504 proximate to a perimeter of the tray 500, where the one or more periphery locations 504 correspond to one or more locations where the one or more magnetic components 202 are installed in the tray table 200. For example, the one or more magnetic components 502 may be installed in a vertical strip and/or a horizontal strip along the side or top edge of the tray 500, respectively. It is noted herein any number of magnetic components 502 may be installed at the one or more periphery locations 504.

The one or more magnetic components 502 may be installed at one or more inner locations 506 defined inside the one or more periphery locations 504 of the tray 500, where the one or more inner locations 506 correspond to one or more locations where the one or more magnetic components 202 are installed in the tray table 200. It is noted herein any number of magnetic components 502 may be installed at the one or more inner locations 506.

The one or more magnetic components 502 may be installed at one or more periphery locations 504 and at one or more inner locations 506 defined inside the one or more periphery locations 504. It is noted herein any number of magnetic components 502 may be installed at the one or more periphery locations 504 and the one or more inner locations 506.

Although embodiments of the disclosure illustrate the one or more magnetic components 502 as being installed within the tray 500, it is noted herein the illustrated locations are not limiting and that the one or more magnetic components 502 may be installed at any exterior location on or interior location within the tray 500 such that the one or more magnetic components 502 may engage the one or more magnetic components 202 when the tray table 200 is in a deployed position.

Figure 6A:
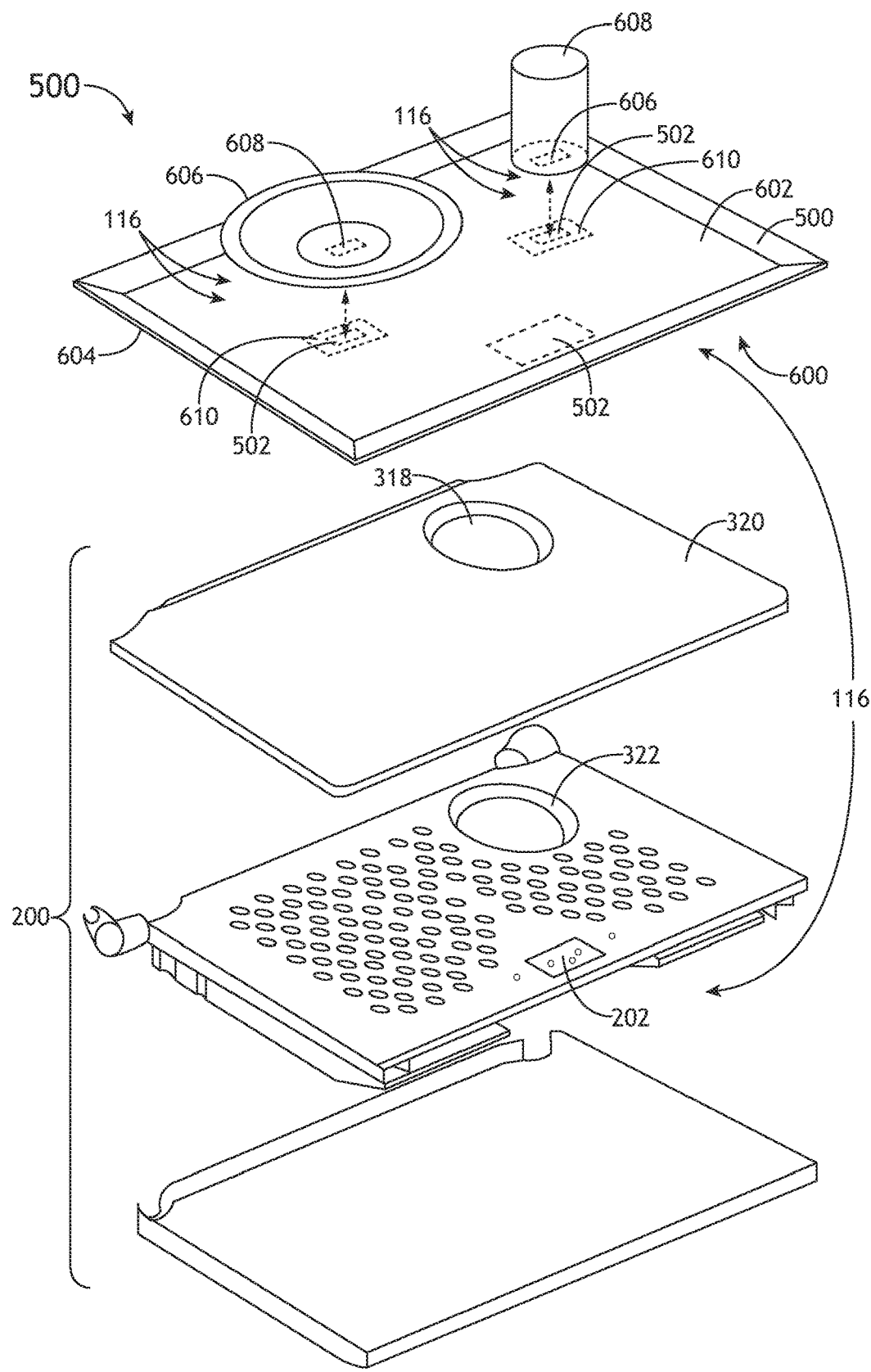
FIG. 6A illustrates an exploded perspective view of an aircraft tray table with an aircraft tray, in accordance with one or more embodiments of the disclosure.
Figure 6B:
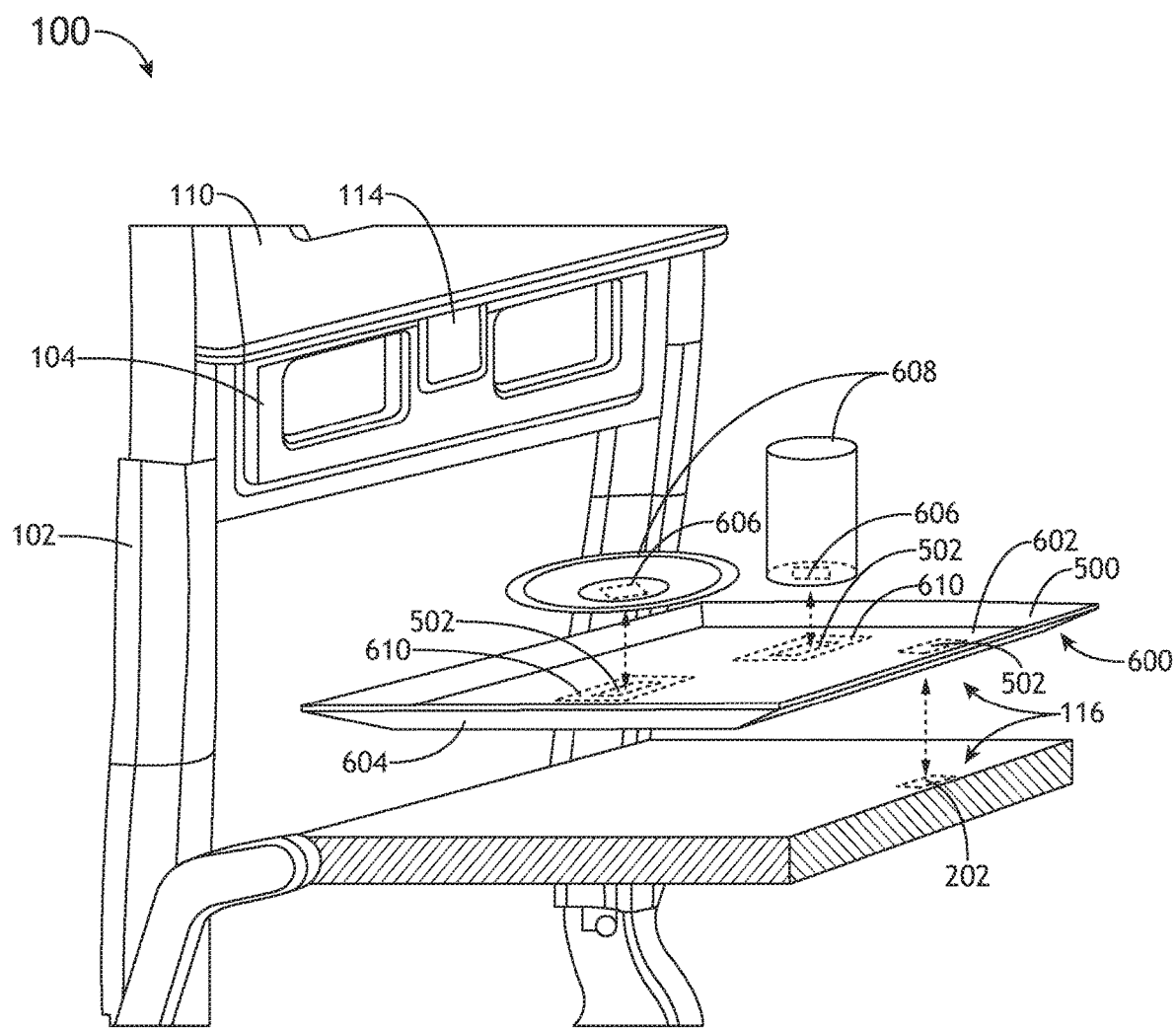
FIG. 6B illustrates a partial perspective view of a portion of an aircraft seat including an aircraft tray table and an aircraft tray, in accordance with one or more embodiments of the disclosure.
Figure 6C:
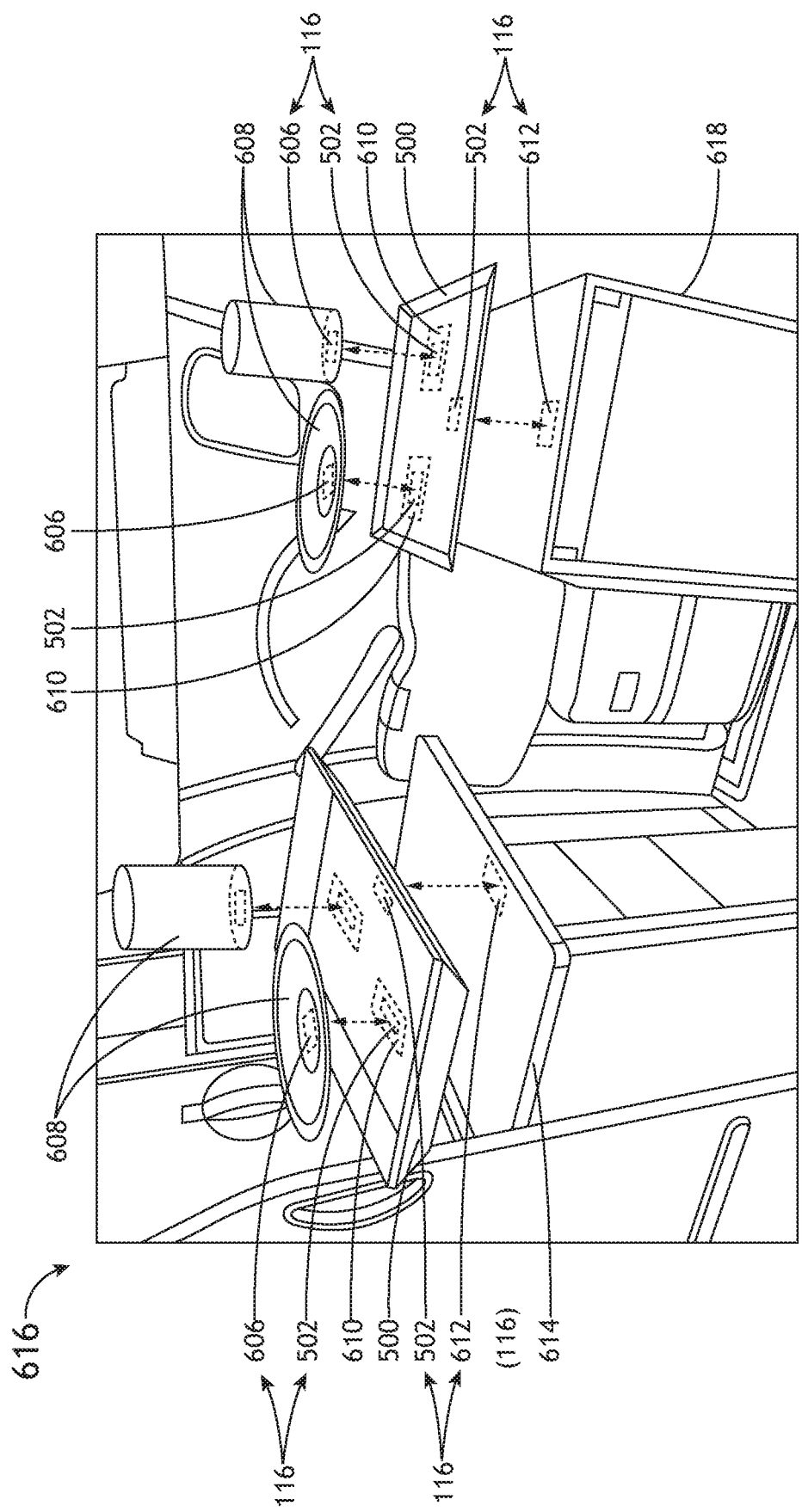
FIG. 6C illustrates an aircraft cabin including a galley workbench and a galley cart, in accordance with one or more embodiments of the disclosure.

FIGS. 6A-6C illustrate example embodiments of the tray 500, the aircraft tray table 200, and the aircraft seat 100, in accordance with one or more embodiments of the disclosure.

An interaction between one or more magnetic components 502 and the one or more magnetic components 202 may be configured to retain the tray 500 against the tray table 200 during flight. It is noted herein the same one or more magnetic components 202 may be configured to interact with the one or more magnetic components 114 to retain the tray table 200 in the stowed position, while also being configured to interact with the one or more magnetic components 502 to retain the tray 500 against the tray table 200 when the tray table 200 in a deployed position.

The tray 500 may include a bottom surface 600 and a top surface 602. For example, the bottom surface 600 may be in contact with the top surface 320 when the one or more magnetic components 502 engage the one or more components 202, while the tray table 200 is in the deployed position.

A user (e.g., passenger, crew member, or the like) may interact with the tray table 200 at any point along at least one of a side surface, an edge, and/or a corner 604 of the tray 500, in order to engage or disengage the magnetic retention assembly 116 (e.g., through engaging or disengaging the one or more magnetic components 502 from the one or more magnetic components 202) and cause the tray 500 to be removed from the tray table 200. It is noted herein the side surface, the edge, and/or the corner 604 may be smooth, or may include one or more grooves or indentations for a user to engage when removing the tray 500 from the tray table 200. In this regard, the tray 500 is configurable per special manufacturing requests.

The one or more magnetic components 502 may be configured to interact with one or more magnetic components 606 of the magnetic retention assembly 116 installed within tableware 608, to prevent the tableware 608 from moving during flight. For example, the tableware 608 may include, but is not limited to, dinnerware (e.g., chinaware or crockery such as dishes or bowls, or the like), flatware (e.g., cutlery such as forks, knives, spoons, or the like), drinkware (e.g., glasses, or the like), serveware (e.g., lids for the dinnerware, or the like), or the like.

For example, the one or more magnetic components 606 may include a magnet of a first polarization or second polarization. For instance, where the one or more magnetic components 502 include a mounting plate, the magnet of the one or more magnetic components 606 may be of a first polarization. In addition, where the one or more magnetic components 502 include a magnet of a first polarization, the magnet of the one or more magnetic components 606 may be of a second polarization configured to attract the first polarization. It is noted herein the magnet may be a mechanism magnet requiring a specific motion (e.g., a twisting motion, or the like), or may be a pushbutton-style magnet or a spring-loaded magnet, giving the magnetic retention assembly 116 a feeling of being a mechanical retention mechanism.

By way of another example, the one or more magnetic components 606 may include an internal plate fabricated from a magnetic metal. For instance, the internal plate may be configured to engage the one or more magnetic components 502, where the one or more magnetic components 502 include a magnet.

By way of another example, the one or more magnetic components 606 may include an electromagnet. For instance, the electromagnet may require a switch installed (e.g., on the tray 500, on the tray table 200, proximate to the tray table 200 or an aircraft seat 100, and/or within an aircraft cabin) for on/off release.

By way of another example, the one or more magnetic components 606 may include a magnetic sensor component. For instance, the magnetic switch may include a magnet or a plate and a sensor coupled to circuitry, where information transmitted via the circuitry is received by a controller within an aircraft including the aircraft seat 100, received by a ground station, or received by an aircraft operator or diagnostic technician (e.g., as illustrated in FIGS. 7A and 7B). For example, the magnetic sensor component may assist in determining whether the tableware 608 is positioned on the tray 500.

It is noted herein that any of the above-listed examples for the one or more magnetic components 606 may be used in addition to or instead of the other above-listed examples for magnetic components of the magnetic retention assembly 116, such that any number or type of magnetic components 606 may be used.

Although embodiments of the disclosure illustrate the one or more magnetic components 606 as being located within the tableware 608, it is noted herein the illustrated locations are not limiting and that the one or more magnetic components 606 may be installed at any exterior location on or interior location within the tableware 608 such that the one or more magnetic components 606 may engage the one or more magnetic components 502 of the tray 500.

It is noted herein the top surface 602 of the tray 500 may include one or more recessed areas 610 configured to receive the tableware 608. Here, the one or more magnetic components 502 may be embedded in the tray 500 proximate to or within the one or more recessed areas 610.

As illustrated in FIG. 6C, the one or more magnetic components 502 of the tray 500 and/or the one or more magnetic components 606 of the tableware 608 may be configured to interact with one or more magnetic components 612 installed within a galley workbench 614 of an aircraft cabin 616. In addition, the one or more magnetic components 502 of the tray 500 and/or the one or more magnetic components 606 of the tableware 608 may be configured to interact with the one or more magnetic components 508 of the magnetic retention assembly 116 installed within a galley cart 618 configured to be stowed or travel within the aircraft cabin 616.

For example, the one or more magnetic components 612 may include a magnet of a first polarization or second polarization. For instance, where the one or more magnetic components 502 of the tray 500 and/or the one or more magnetic components 606 of the tableware 608 include a mounting plate, the magnet of the one or more magnetic components 612 may be of a first polarization. In addition, where the one or more magnetic components 502 of the tray 500 and/or the one or more magnetic components 606 of the tableware 608 include a magnet of a first polarization, the magnet of the one or more magnetic components 612 may be of a second polarization configured to attract the first polarization. It is noted herein the magnet may be a mechanism magnet requiring a specific motion (e.g., a twisting motion, or the like), or may be a pushbutton-style magnet or a spring-loaded magnet, giving the magnetic retention assembly 116 a feeling of being a mechanical retention mechanism.

By way of another example, the one or more magnetic components 612 may include a plate fabricated from a magnetic metal. For instance, the plate may be configured to engage the one or more magnetic components 502 of the tray 500 and/or the one or more magnetic components 606 of the tableware 608, where the one or more magnetic components 502 of the tray 500 and/or the one or more magnetic components 606 of the tableware 608 include a magnet.

By way of another example, the one or more magnetic components 612 may include an electromagnet. For instance, the electromagnet may require a switch installed (e.g., on the galley workbench 614, on the galley cart 618, proximate to the galley workbench 614 or the galley cart 618, and/or within the aircraft cabin 616) for on/off release.

By way of another example, the one or more magnetic components 612 may include a magnetic sensor component. For instance, the magnetic switch may include a magnet or a plate and a sensor coupled to circuitry, where information transmitted via the circuitry is received by a controller within an aircraft including the aircraft cabin 616, received by a ground station, or received by an aircraft operator or diagnostic technician (e.g., as illustrated in FIGS. 7A and 7B). For example, the magnetic sensor component may assist in determining whether the tray 500 and/or the tableware 608 is on the galley workbench 614 or the galley cart 618.

It is noted herein that any of the above-listed examples for the one or more magnetic components 612 may be used in addition to or instead of the other above-listed examples for magnetic components of the magnetic retention assembly 116, such that any number or type of magnetic components 612 may be used.

Although embodiments of the disclosure illustrate the tableware 608 being positionable on the tray 500 and the tray 500 being positionable on the galley workbench 614 and/or the galley cart 618 in FIG. 6C, it is noted herein the tableware 608 may be positionable directly on the galley workbench 614 and/or the galley cart 618 (with corresponding magnetic components 606 of the tableware 608 being configured to engage directly with the magnetic components 612 of the galley workbench 614 and/or the galley cart 618), such that the tray 500 is not in place.

Although embodiments of the disclosure illustrate the one or more magnetic components 612 as being located within the galley workbench 614 and/or the galley cart 618, it is noted herein the illustrated locations are not limiting and that the one or more magnetic components 612 may be installed at any exterior location on or interior location within the galley workbench 614 and/or the galley cart 618 such that the one or more magnetic components 612 may engage the one or more magnetic components 502 of the tray 500 and/or the one or more magnetic components 606 of the tableware 608.

FIGS. 7A and 7B illustrate a simplified block diagram of an aircraft 700, in accordance with one or more embodiments of the disclosure. It is noted herein the aircraft 700 should be understood as including one or more of the aircraft seat 100, the tray table 200, the aircraft cabin 616, the galley workbench 614, and/or the galley cart 618, for purposes of the present disclosure.

Where the one or more magnetic components 114, 202, 502, 606, 616 of the magnetic retention assembly 116 include a magnetic sensor component or other electromagnet component, the magnetic retention assembly 116 may be coupled to one or more controllers 702 within an aircraft 700.

The one or more controllers 702 may include one or more processors 704 and memory 706. The memory 706 may store one or more sets of program instructions 708. The one or more processors 704 may be configured to execute the one or more sets of program instructions 708 to carry out one or more of the various steps described throughout the disclosure.

The aircraft 700 may include one or more power sources 710. For example, the one or more power sources 710 may be installed within the one or more controllers 702, and may be in communication with the magnetic retention assembly 116. By way of another example, the one or more power sources 710 may be housed separately from the one or more controllers 702, and may be in communication with the magnetic retention assembly 116 and the one or more controllers 702.

The one or more controllers 702 may include one or more communication interfaces. For example, the one or more communication interfaces may include via wired means or via wireless means (e.g., via Bluetooth, Wi-Fi, Near Field Communication (NFC), or the like), where the one or more communication interfaces may be configured to receive data, transmit data, transmit power, or otherwise interact with the other controllers in the aircraft 700.

The one or more controllers 702 may be coupled (e.g., physically, electrically, and/or communicatively coupled) to the magnetic retention assembly 116. The one or more controllers 702 may transmit power, control signals, data, or the like (e.g., one or more signals) to the magnetic retention assembly 116. The one or more controllers 702 may receive power, control signals, data, or the like (e.g., the one or more signals) from the one or more components in the magnetic retention assembly 116.

For example, the one or more controllers 702 may determine whether the tray table 200 is in a stowed or a deployed position based on data from the magnetic retention assembly 116. By way of another example, the one or more controllers 702 may determine whether the tray 500 is in a stowed or a deployed position based on data from the magnetic retention assembly 116. By way of another example, the one or more controllers 702 may determine whether the tableware 608 is in a stowed or a deployed position based on data from the magnetic retention assembly 116.

The one or more processors 704 may include any one or more processing elements known in the art. In this sense, the one or more processors 704 may include any microprocessor device configured to execute algorithms and/or program instructions 708. In general, the term "processor" may be broadly defined to encompass any device having one or more processing elements, which execute a set of program instructions 708 from a non-transitory memory medium (e.g., the memory 706), where the one or more sets of program instructions 708 are configured to cause the one or more processors 704 to carry out any of one or more process steps.

The memory 706 may include any storage medium known in the art suitable for storing the one or more sets of program instructions 708 executable by the associated one or more processors 704. For example, the memory 706 may include a non-transitory memory medium. For instance, the memory 706 may include, but is not limited to, a read-only memory (ROM), a random-access memory (RAM), a magnetic or optical memory device (e.g., disk), a magnetic tape, a solid-state drive, and the like. The memory 706 may be configured to provide display information to one or more displays. In addition, the memory 706 may be configured to store user input information from one or more user input devices. The memory 706 may be housed in a common controller housing with the one or more processors 704. The memory 706 may, alternatively or in addition, be located remotely with respect to the spatial location of the processors 704 and/or the one or more controllers 702. For instance, the one or more processors 704 and/or the one or more controllers 702 may access a remote memory 706 (e.g., server), accessible through a network (e.g., internet, intranet, and the like) via one or more communication interfaces.

The one or more communication interfaces may be operatively configured to communicate with one or more components of the one or more controllers 702 and/or the magnetic retention assembly 116. For example, the one or more communication interfaces may also be coupled (e.g., physically, electrically, and/or communicatively) with the one or more processors 704 to facilitate data transfer between components of the one or more components of the one or more controllers 702 and/or the magnetic retention assembly 116 and the one or more processors 704. For instance, the one or more communication interfaces may be configured to retrieve data from the one or more processors 704, or other devices, transmit data for storage in the memory 706, retrieve data from storage in the memory 706, or the like. By way of another example, the magnetic retention assembly 116 and/or one or more offboard controllers may be configured to receive and/or acquire data or information from other systems or tools by a transmission medium that may include wireline and/or wireless portions. By way of another example, the magnetic retention assembly 116 and/or the one or more offboard controllers may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the magnetic retention assembly 116 and/or the one or more offboard controllers and the other subsystems (e.g., of the aircraft 700). In addition, the magnetic retention assembly 116 and/or the one or more offboard controllers may be configured to send data to external systems via a transmission medium (e.g., network connection).

As illustrated in FIGS. 7A and 7B, the controller 702 of the aircraft 700 may operate as a central computer, transferring information between the components 114, 202, 502, 606, 616 of the magnetic retention assembly 116 and a ground station 714 and/or a technician 716. It is noted herein, however, the components 114, 202, 502, 606 of the magnetic retention assembly 116 may directly transfer information to the ground station 714 and/or the technician 716. In this regard, the ground station 714 and/or the technician 716 may remotely monitor the components of the magnetic retention assembly 116 and housing elements (e.g., the aircraft seat 100, the tray table 200, the tray 500, the tableware 608).

It is noted herein the magnetic retention assembly 116 may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For instance, both the aircraft seat and the coupled-to or integrated-with privacy panels may be tested as a dynamic object needing to be compliant with 16 G force requirements per aviation guidelines and/or standards set forth in at least 14 C.F.R. Part 25, AIRWORTHINESS STANDARDS: TRANSPORT CATEGORY AIRPLANES in effect at the time of filing, in contrast to a static object only needing to be able to be compliant with 9 G force requirements per aviation guidelines and/or standards set forth in at least 14 C.F.R. Part 25, AIRWORTHINESS STANDARDS: TRANSPORT CATEGORY AIRPLANES. In addition, it is noted herein that being compliant with the 16 G force requirements may allow for the tray table 200 deploying during an incident without failing certification, as long as the tray table 200 may be re-latched. As such, the magnetic retention assembly 116 may have a greater chance of passing certification, as it does not include components that may be broken during an incident, as opposed to a retainer latch assembly (e.g., the retainer latch may be snapped during the incident, preventing the retainer latch assembly from being re-latched).

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft tray table retention assembly, comprising:
a seat magnetic component installed within a rear bezel of an aircraft seat; and
a tray table magnetic component installed within an aircraft tray table, the aircraft tray table comprising a casing and a frame installed within the casing, a top surface of the aircraft tray table being a surface of the casing, the frame including a cut-out receiving at least a portion of the tray table magnetic component, the aircraft tray table coupled to the aircraft seat via at least one of one or more hinges or a set of rails, the aircraft tray table configured to actuate between a stowed position and a deployed position via the at least one of the one or more hinges or the set of rails,
the tray table magnetic component configured to engage the seat magnetic component when the aircraft tray table is in the stowed position,
the top surface of the aircraft tray table being in contact with at least one of the seat magnetic component or the rear bezel when the aircraft tray table is in the stowed position,
the tray table magnetic component being configured to disengage from the seat magnetic component when a force is applied to at least one of a side surface, an edge, or a corner of the aircraft tray table.

2. The aircraft tray table retention assembly of claim 1, the casing comprising a bottom shell and a top shell attached to the bottom shell, the top shell including the top surface.

3. The aircraft tray table retention assembly of claim 1, the seat magnetic component including a mounting plate fabricated from a magnetic metal, the mounting plate coupled to the bezel via a bezel bracket, the tray table magnetic component including a magnet.

4. The aircraft tray table retention assembly of claim 1, the seat magnetic component including a magnet, the tray table magnetic component including an internal plate fabricated from a magnetic metal.

5. The aircraft tray table retention assembly of claim 1, the seat magnetic component including a magnet of a first polarization, the tray table magnetic component including a magnet of a second polarization, the magnet of the second polarization being configured to attract the magnet of the first polarization.

6. The aircraft tray table retention assembly of claim 1, the seat magnetic component including an electromagnet, the tray table magnetic component including an internal plate fabricated from a magnetic metal, the electromagnet being configured to be controlled via a switch installed on the aircraft tray table, proximate to the aircraft tray table, or within an aircraft cabin 7including the aircraft seat.

7. The aircraft tray table retention assembly of claim 1, the seat magnetic component including a magnetic sensor, the magnetic sensor being configured to transmit information to a controller within an aircraft cabin including the aircraft seat, the information transmitted including a determination whether the aircraft tray table is in the stowed position or the deployed position.

8. An aircraft tray table retention assembly, comprising:
a tray magnetic component installed within an aircraft tray; and
a tray table magnetic component installed within an aircraft tray table, the aircraft tray table comprising a casing and a frame installed within the casing, a top surface of the aircraft tray table being a surface of the casing, the frame including a cut-out receiving at least a portion of the tray table magnetic component, the aircraft tray table coupled to an aircraft seat via at least one of one or more hinges or a set of rails, the aircraft tray table configured to actuate between a stowed position and a deployed position via the at least one of the one or more hinges or the set of rails,
the tray magnetic component being configured to engage the tray table magnetic component when the aircraft tray table is in the deployed position,
a bottom surface of the aircraft tray being in contact with a top surface of the aircraft tray table when the aircraft tray table is in the deployed position,
the tray magnetic component being configured to disengage from the tray table magnetic component when a force is applied to at least one of a side surface, an edge, or a corner of the aircraft tray.

9. The aircraft tray table retention assembly of claim 8, the tray table magnetic component including an internal plate fabricated from a magnetic metal, the tray magnetic component including a magnet.

10. The aircraft tray table retention assembly of claim 8, the tray table magnetic component including a magnet, the tray magnetic component including an internal plate fabricated from a magnetic metal.

11. The aircraft tray table retention assembly of claim 8, the tray table magnetic component including a magnet of a first polarization, the tray magnetic component including a magnet of a second polarization, the magnet of the second polarization being configured to attract the magnet of the first polarization.

12. The aircraft tray table retention assembly of claim 8, the tray table magnetic component including an electromagnet, the tray magnetic component including an internal plate fabricated from a magnetic metal, the electromagnet being configured to be controlled via a switch installed on the aircraft tray table, proximate to the aircraft tray table, or within an aircraft cabin including the aircraft seat.

13. The aircraft tray table retention assembly of claim 8, the tray table magnetic component including a magnetic sensor, the magnetic sensor being configured to transmit information to a controller within an aircraft cabin including the aircraft seat, the information transmitted including a determination whether the aircraft tray is positioned on the aircraft tray table.

14. The aircraft tray table retention assembly of claim 8, the tray table being positionable on a galley workbench, the galley workbench including a galley workbench magnetic component, the tray table magnetic component installed within the tray table being configured to engage the galley workbench magnetic component when the tray table is positioned on the galley workbench.

15. The aircraft tray table retention assembly of claim 8, the tray table being positionable on a galley cart, the galley cart including a galley cart magnetic component, the tray table magnetic component installed within the tray table being configured to engage the galley cart magnetic component when the tray table is positioned on the galley cart.

\* \* \* \* \*